(12) United States Patent
Willard, Jr.

(10) Patent No.: US 7,703,493 B2
(45) Date of Patent: Apr. 27, 2010

(54) TYRE HAVING ASYMMETRICAL SELF-SUPPORTING SIDEWALLS

(75) Inventor: Walter Lee Willard, Jr., Greenville, SC (US)

(73) Assignee: Michelin Recherche et Technique S.A., Granges-Paccot (CH)

( * ) Notice: Subject to any disclaimer, the term of this patent is extended or adjusted under 35 U.S.C. 154(b) by 967 days.

(21) Appl. No.: 11/477,594

(22) Filed: Jun. 30, 2006

(65) Prior Publication Data

US 2007/0012391 A1   Jan. 18, 2007

Related U.S. Application Data

(63) Continuation of application No. PCT/EP2004/014018, filed on Dec. 9, 2004.

(30) Foreign Application Priority Data

Dec. 30, 2003   (FR)   .................... 03 15552

(51) Int. Cl.
*B60C 17/00* (2006.01)
*B60C 3/06* (2006.01)

(52) U.S. Cl. ...................... 152/455; 152/517
(58) Field of Classification Search .................. 152/517, 152/455, 456
See application file for complete search history.

(56) References Cited

U.S. PATENT DOCUMENTS

| | | | |
|---|---|---|---|
| 3,339,610 A * | 9/1967 | Fausti et al. ................. | 152/455 |
| 4,203,481 A | 5/1980 | Ranik, Jr. | |
| 5,660,656 A | 8/1997 | Herbelleauu et al. | |
| 6,263,935 B1 | 7/2001 | Oare et al. | |
| 6,453,961 B1 | 9/2002 | Colantonio et al. | |
| 6,561,245 B1 | 5/2003 | Close et al. | |
| 6,860,307 B1 * | 3/2005 | Matsumoto et al. ......... | 152/455 |
| 7,278,455 B2 | 10/2007 | Hedo et al. | |
| 2002/0062894 A1 | 5/2002 | Miner et al. | |

FOREIGN PATENT DOCUMENTS

| | | |
|---|---|---|
| EP | 0 985 558 A2 | 3/2000 |
| JP | 10-138719 A | 5/1998 |
| WO | WO 2006071228 A1 | 7/2006 |
| WO | WO 2006071229 A1 | 7/2006 |
| WO | WO 2006071230 A1 | 7/2006 |

OTHER PUBLICATIONS

Chinese Office Action dated Apr. 4, 2008 in corresponding Chinese Appln. No. 200480039372.X and English translation.

* cited by examiner

*Primary Examiner*—Adrienne C Johnstone
(74) *Attorney, Agent, or Firm*—Buchanan Ingersoll & Rooney PC

(57) ABSTRACT

A tire suitable for extended-mobility travel includes sidewalls reinforced by a sidewall insert, namely an inner insert in the inner sidewall, and an outer insert in the outer sidewall. The inserts are made of rubber composition enabling the sidewalls to bear a load corresponding to part of the weight of the vehicle in a situation in which the inflation pressure is substantially reduced or zero. The inner sidewall, and more particularly the insert of this inner sidewall, has a substantially higher modulus of extension than the outer sidewall (and more particularly than the insert of this outer sidewall). The outer insert is subdivided into at least two zones; the inner insert can comprise one or more zones, but always fewer than the number of zones of the outer insert.

11 Claims, 6 Drawing Sheets

TYRE HAVING ASYMMETRICAL SELF-SUPPORTING SIDEWALLS

This application is a continuation of International Application Ser. No. PCT/EP2004/014018 filed on Dec. 9, 2004, and published in the French language under WO 2005/072992 on Aug. 11, 2005.

BACKGROUND

The present invention relates to an extended-mobility tyre of the asymmetrical self-supporting sidewall type, having optimum comfort and behaviour characteristics.

For some years, tyre manufacturers have been devoting particularly great effort to developing original solutions to a problem dating back to the very first time use was made of wheels fitted with tyres of the inflated type, namely how to allow the vehicle to continue on its journey despite a considerable or total loss of pressure in one or more tyres. For decades, the spare wheel was considered to be the sole, universal solution. Then, more recently, the considerable advantages linked to the possible elimination thereof have become apparent. The concept of "extended mobility" is being developed. The associated techniques allow travel to continue with the same tyre, within certain limits, after a puncture or a drop in pressure. This allows the driver to travel to a repair point, for example, without having to stop, in frequently dangerous circumstances, to fit the spare wheel.

Two major types of extended-mobility technology are currently available on the automobile market. On the one hand, there are tyres of the self-supporting type (often known by their abbreviation ZP, standing for "zero pressure"). Self-supporting tyres are capable of bearing a load under reduced pressure, or indeed without pressure, thanks to sidewalls which are reinforced, most frequently by means of inserts of rubber material, provided in the sidewalls. This type of solution has the disadvantage of having relatively rigid sidewalls, which thus adversely affect the comfort and the endurance. Large masses of materials are necessary to impart to the sidewalls the rigidity required for the self-supporting function.

On the other hand, wheels are available which are equipped with supports capable of supporting the inside of the tread of a tyre in the event of sagging of the sidewalls following a drop in pressure. This solution is advantageously combined with a tyre comprising a bottom zone capable of minimising the risk of the tyre sliding out of the rim. This solution is advantageous since it makes it possible to keep substantially intact the characteristics of travel under normal conditions. On the other hand, it has the drawback of requiring an additional component, the support, for each of the wheels of the vehicle.

SUMMARY OF INVENTION

To overcome these various drawbacks, the invention proposes a tyre suitable for extended-mobility travel, comprising at least one carcass-type reinforcement structure anchored on each side of said tyre in a bead the base of which is intended to be mounted on a rim seat, each of said beads extending substantially radially externally in the form of sidewalls, namely an inner sidewall, intended to be positioned on the inside of the vehicle, and an outer sidewall, intended to be positioned on the outside of the vehicle, the inner and outer sidewalls joining a tread radially towards the outside, the carcass-type reinforcement structure extending circumferentially from the bead towards said sidewall, a crown reinforcement, each of the beads furthermore comprising an anchoring zone permitting the reinforcement structure to be held, each of said sidewalls being reinforced by a sidewall insert, namely an inner insert in the inner sidewall, and an outer insert in the outer sidewall, said inserts being formed of rubber composition enabling the sidewall to bear a load corresponding to part of the weight of the vehicle in a situation in which the inflation pressure is substantially reduced or zero, the inner sidewall (and more particularly the insert of this sidewall) having a substantially higher modulus than the outer sidewall (and more particularly than the insert of this sidewall), the outer insert and the inner insert being subdivided into an unequal number of zones.

Such a tyre possesses better behaviour and endurance qualities than a tyre having a reinforced sidewall of known type. The levels of performance in question are comparable to the levels of the good tyres without reinforced sidewalls.

Furthermore, on cornering, an increase in the surface of the area of contact is noted on the outer side, which is advantageous for the behaviour of the tyre. With a sidewall of lower modulus, better deradialisation of the outer sidewall can be obtained.

Furthermore, such an arrangement offers the possibility of reducing the weight of the outer sidewall relative to the inner sidewall, with a net saving in weight for the entire product. Finally, the outer sidewall may be thinner than the inner sidewall: such asymmetry of the thicknesses of the sidewalls may make it possible to reduce the weight of the tyre.

According to one example of embodiment, the outer insert comprises at least two zones, for example an axially outer zone, of given modulus, and an axially inner zone, the modulus of which is lower. These characteristics make it possible to improve the durability and the comfort, to reduce the rolling resistance, and to increase the area of contact with the running surface.

According to another example of embodiment, the outer insert comprises three zones, for example a substantially central zone, having the highest modulus, an axially inner zone, of lower modulus than that of the central zone, and an axially outer zone, also of lower modulus than that of the central zone. As the inner zone is the most stressed, the positioning of this specific mix at this point makes it possible to optimise the supporting effect.

According to one example of embodiment, the modulus of the axially inner zone is greater than that of the axially outer zone. According to another example of embodiment, the modulus of the axially outer zone and the modulus of the axially inner zone are substantially equal.

The inner insert preferably comprises at least two zones, for example an axially outer zone, of given modulus, and an axially inner zone, the modulus of which is lower.

According to an advantageous variant, the inner insert comprises three zones, for example a substantially central zone, having the highest modulus, an axially inner zone, of lower modulus than that of the central zone, and an axially outer zone, also of lower modulus than that of the central zone.

According to one advantageous embodiment of the tyre according to the invention, one of the sidewall inserts is preferably formed of a rubber composition having a secant modulus of extension ME10 at 10% deformation, measured at 23° C. in accordance with Standard ASTM D 412, of from 5 to 13 MPa.

The rubber composition of a portion of insert preferably comprises (phr: parts by weight per hundred parts of elastomer(s)):

from 20 to 100 phr of natural rubber or of a synthetic polyisoprene having a high cis-1,4 linkage content, and from 80 to 0 phr of a polybutadiene and/or of a copolymer of butadiene and a vinyl-aromatic monomer, such as a styrene/butadiene copolymer.

Advantageously, the rubber composition of an insert comprises:

from 20 to 50 phr of natural rubber or of a synthetic polyisoprene having a high cis-1,4 linkage content, and from 80 to 50 phr of a polybutadiene and/or of a copolymer of butadiene and a vinyl-aromatic monomer, such as a styrene/butadiene copolymer.

Preferably, each of said sidewall inserts has a thickness of from 3 mm to 20 mm, and preferably of 5 mm to 14 mm.

BRIEF DESCRIPTION OF THE DRAWINGS

All the details of embodiment are given in the following description, supplemented by FIGS. 1 to 6, in which.

DESCRIPTION OF PREFERRED EMBODIMENTS

Figure 1:
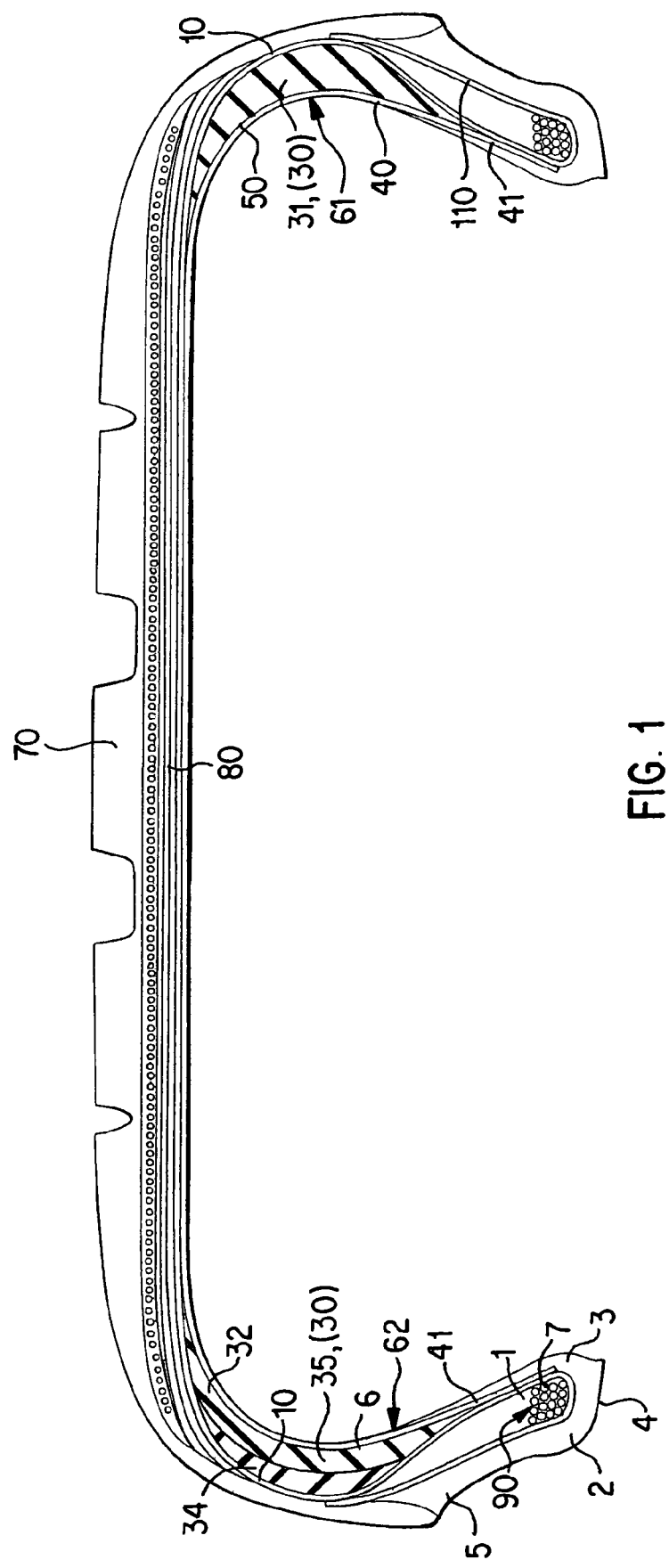
FIG. 1 illustrates a radial section showing essentially the beads, the sidewalls and the crown of an example of embodiment of a first type of tyre according to the invention.

The reinforcement armature or reinforcement of the tyres is currently—and most frequently—constituted by stacking one or more plies conventionally referred to as "carcass plies", "crown plies", etc. This manner of designating the reinforcement armatures is derived from the manufacturing process, which consists of producing a series of semi-finished products in the form of plies, provided with cord reinforcing threads which are frequently longitudinal, which plies are then assembled or stacked in order to build a tyre blank. The plies are produced flat, with large dimensions, and are subsequently cut according to the dimensions of a given product. The plies are also assembled, in a first phase, substantially flat. The blank thus produced is then shaped to adopt the toroidal profile typical of tyres. The semi-finished products referred to as "finishing" products are then applied to the blank, to obtain a product ready to be vulcanised.

Such a type of "conventional" process involves, in particular for the phase of manufacture of the blank of the tyre, the use of an anchoring element (generally a bead wire), used for anchoring or holding the carcass reinforcement in the zone of the beads of the tyre. Thus, in this type of process, a portion of all the plies constituting the carcass reinforcement (or only a part thereof) is turned up around a bead wire arranged in the bead of the tyre. In this manner, the carcass reinforcement is anchored in the bead.

The general adoption of this type of conventional process in the industry, despite the numerous different ways of producing the plies and assemblies, has led the person skilled in the art to use a vocabulary which reflects the process; hence the generally accepted terminology, comprising in particular the terms "plies", "carcass", "bead wire", "shaping" to designate the change from a flat profile to a toroidal profile, etc.

However, there are nowadays tyres which do not, properly speaking, comprise "plies" or "bead wires" in accordance with the preceding definitions. For example, document EP 0 582 196 (corresponding to Herbellelauu et al. U.S. Pat. No. 5,660,656) describes tyres manufactured without the aid of semi-finished products in the form of plies. For example, the cords of the different reinforcement structures are applied directly to the adjacent layers of rubber mixes, the whole being applied in successive layers on a toroidal core having a shape which makes it possible to obtain directly a profile similar to the final profile of the tyre being manufactured. Thus, in this case, there are no longer any "semi-finished products", nor "plies", nor "bead wires". The base products, such as the rubber mixes and reinforcing threads in the form of cords or filaments, are applied directly to the core. As this core is of toroidal form, the blank no longer needs to be shaped in order to change from a flat profile to a profile in the form of a torus.

Furthermore, the majority of the examples of embodiment of tyres described in this document do not have the "conventional" upturn of the carcass ply around a bead wire. In these examples, this type of anchoring is replaced by an arrangement in which circumferential filaments are arranged adjacent to said sidewall reinforcement structure, the whole being embedded in an anchoring or bonding rubber composition.

There are also processes for assembly on a toroidal core using semi-finished products specially adapted for quick, effective and simple laying on a central core. Finally, it is also possible to use a mixture comprising both certain semi-finished products to produce certain architectural aspects (such as plies, bead wires, etc.), whereas others are produced from the direct application of mixes and/or reinforcing threads in the form of filaments or strips.

In the present document, in order to take into account recent technological developments both in the field of manufacture and in the design of products, the conventional terms such as "plies", "bead wires", etc. are advantageously replaced by neutral terms or terms which are independent of the type of process used. Thus, the term "carcass-type reinforcing thread" or "sidewall reinforcing thread" is valid as a designation for the reinforcement cords of a carcass ply in the conventional process, and the corresponding cords, generally applied at the level of the sidewalls, of a tyre produced in accordance with a process without semi-finished products. The term "anchoring zone", for its part, may equally well designate the "traditional" upturn of a carcass ply around a bead wire of a conventional process or the assembly formed by the circumferential filaments, the rubber composition and the adjacent sidewall reinforcement portions of a bottom zone produced with a process with application to a toroidal core.

In the present description, the term "cord" very generally designates both monofilaments and multifilaments or assemblies such as cables, plied yarns or alternatively any equivalent type of assembly, whatever the material and the treatment of these cords. This may, for example, involve surface treatments, coating or pre-sizing in order to promote adhesion to the rubber. The expression "unitary cord" designates a cord formed of a single element, without assembling. The term "multifilament", in contrast, designates an assembly of at least two unitary elements to form a cable, plied yarn etc.

"Characteristics of the cord" is understood to mean, for example, its dimensions, its composition, its characteristics and mechanical properties (in particular the modulus), its chemical characteristics and properties, etc.

In the present description, "contact" between a cord and a layer of bonding rubber is understood to mean the fact that at least part of the outer circumference of the cord is in intimate contact with the rubber composition constituting the bonding rubber.

It is known that, conventionally, the carcass ply or plies is/are turned up about a bead wire. The bead wire then performs a carcass anchoring function. Thus, in particular, it withstands the tension which develops in the carcass cords for example under the action of the inflation pressure. The other type of arrangement described in the present document makes it possible to provide a similar anchoring function. It is also known to use the bead wire of conventional type to perform the function of clamping the bead on a rim. The other type of arrangement described in the present document also makes it possible to provide a similar clamping function.

"Sidewalls" refers to the portions of the tyre, most frequently of low flexural strength, located between the crown and the beads. "Sidewall mix" refers to the rubber mixes located axially to the outside relative to the cords of the reinforcement structure of the carcass and to their bonding rubber. These mixes usually have a low elasticity modulus.

"Bead" refers to the portion of the tyre adjacent radially internally to the sidewall.

"Modulus of extension ME10" (hereafter "modulus") of a rubber composition is understood to mean an apparent secant modulus of extension obtained at a uniaxial deformation of extension of the order of 10% measured at 23° C. in accordance with Standard ASTM D 412.

The expression "based on" is understood in known manner to mean that the constituent which follows is present in the composition in a majority proportion.

As a reminder, "radially upwards" or "radially upper" or "radially externally" means towards the largest radii.

A carcass-type reinforcement or reinforcing structure will be said to be radial when its cords are arranged at 90°, but also, according to the terminology in use, at an angle close to 90°.

FIG. 1 shows the bottom zone, in particular the bead 1 of a first form of embodiment of the tyre according to the invention. The bead 1 comprises an axially outer portion 2 which is provided and shaped so as to be placed against the flange of a rim. The upper portion, or radially outer portion, of the portion 2 forms a portion 5 adapted to the rim hook. This portion is mainly curved axially towards the outside, as illustrated in FIG. 1. The portion 2 ends radially and axially towards the inside in a bead seat 4 which is adapted to be placed against a rim seat. The bead also comprises an axially inner portion 3, which extends substantially radially from the seat 4 towards the sidewall 6.

The tyre also comprises a reinforcement or reinforcing structure 10 of carcass type provided with reinforcing threads which are advantageously shaped in a substantially radial arrangement. This structure may be arranged continuously from one bead to the other, passing through the sidewalls and the crown of the tyre, or alternatively it may comprise two or more parts, arranged for example along the sidewalls, without covering the entire crown.

In order to position the reinforcement cords as accurately as possible, it is very advantageous to build the tyre on a rigid support, for example a central core which imposes the shape of its inner cavity. There are applied to this core, in the order required by the final architecture, all the constituents of the tyre, which are arranged directly in their final position, without the profile of the tyre having to be modified during building.

Figure 2:
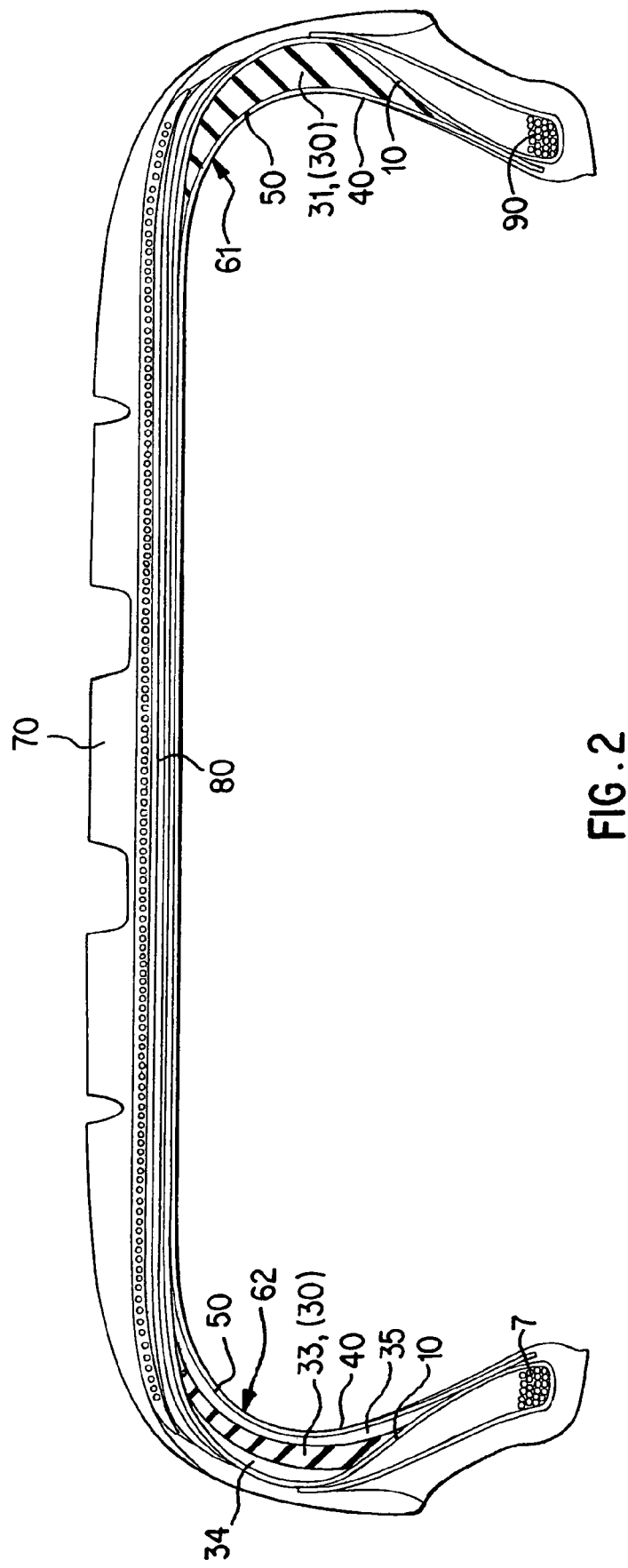
FIG. 2 illustrates a radial section showing essentially the beads, the sidewalls and the crown of an example of embodiment of a second type of tyre according to the invention.

Two main types of anchoring of the carcass-type reinforcement structure are possible. Typically, as illustrated in FIGS. 1 and 2, the anchoring zone comprises a bead wire 7, formed of a multi-wire arrangement, around which the reinforcement structure 10 is wound, preferably starting from the axially inner side then moving towards the axially outer side, after passing radially internally relative to the bead wire. The free end 110 of the reinforcement structure 10 then re-ascends radially externally. This type of anchoring, which is conventionally known and widely used, is simple to produce, economic, and durable. The upturn of said structure 10 around a bead wire 7 at the level of the bead 1 anchors the carcass-type reinforcement structure in the bead.

Figure 3:
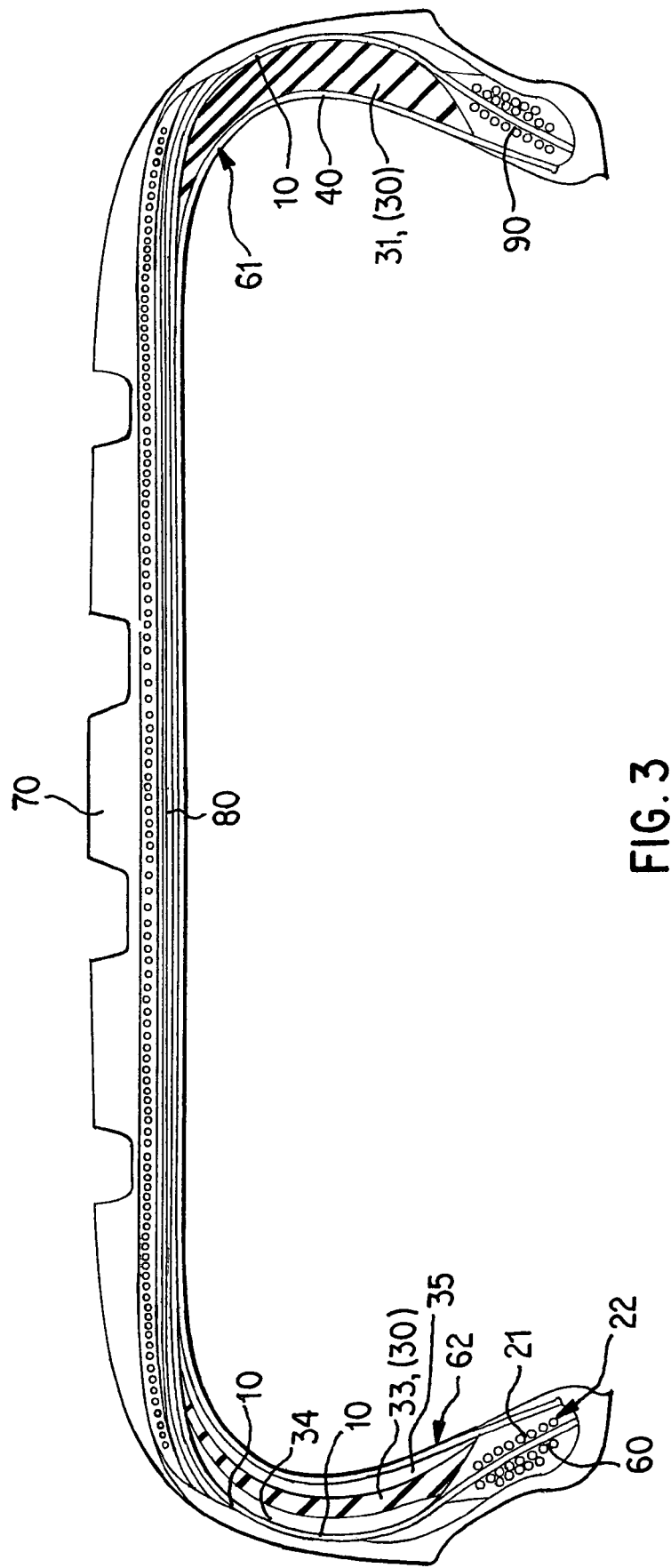
FIG. 3 illustrates a radial section showing essentially the beads, the sidewalls and the crown of an example of embodiment of another type of tyre according to the invention.
Figure 4:
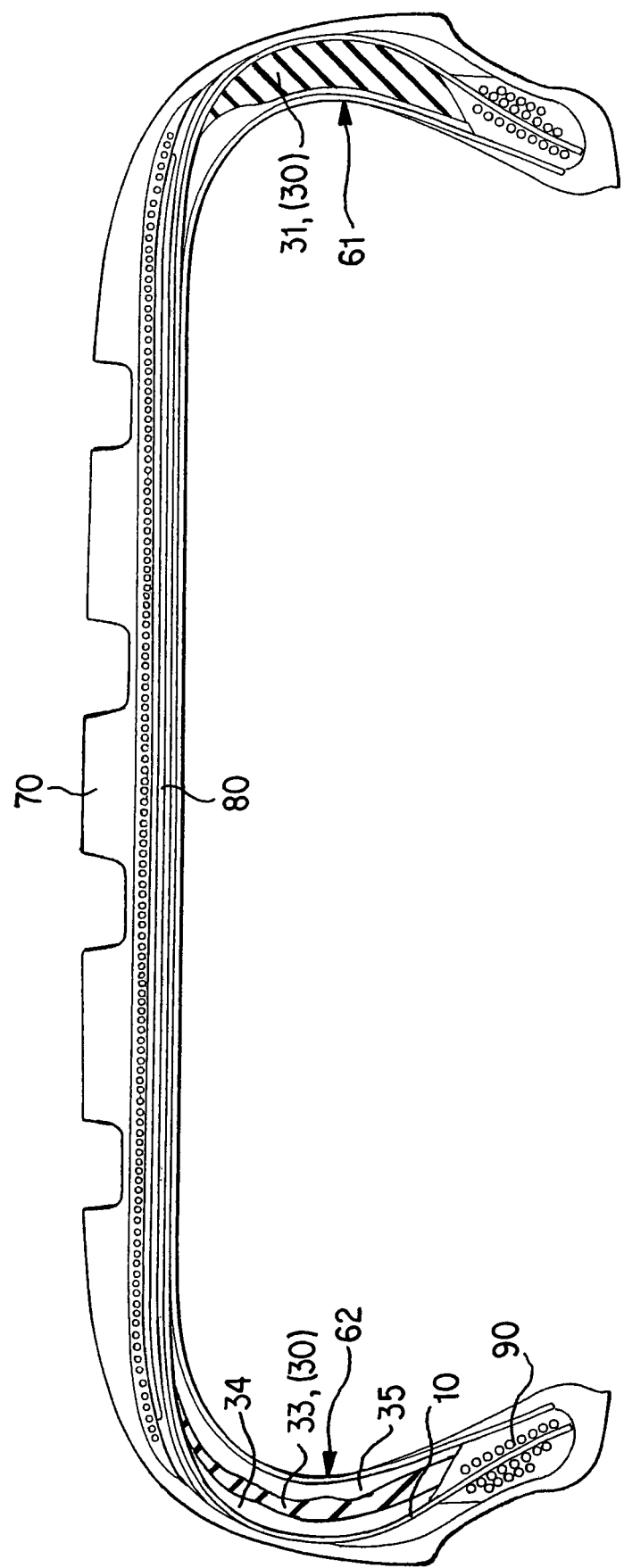
FIG. 4 illustrates a radial section showing essentially the beads, the sidewalls and the crown of an example of embodiment of another type of tyre according to the invention.
Figure 5:
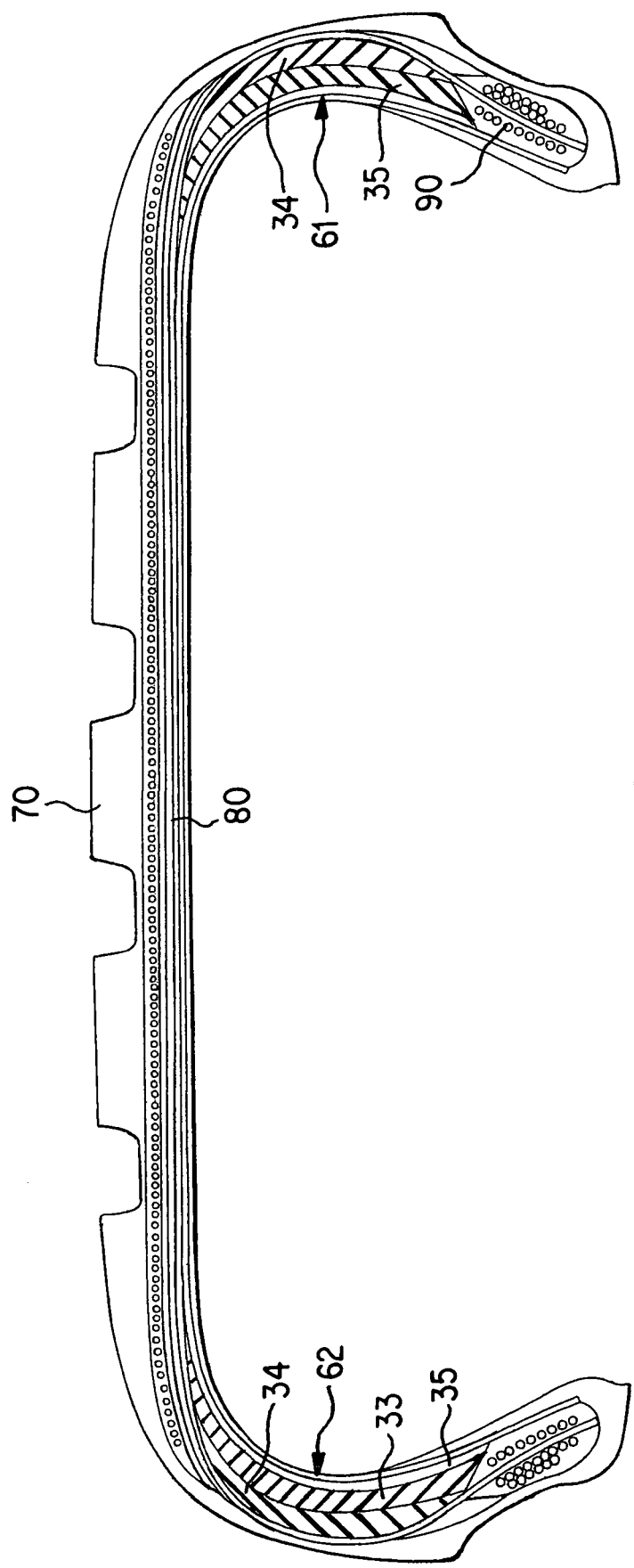
FIG. 5 illustrates a radial section showing essentially the beads, the sidewalls and the crown of another example of embodiment of the tyre according to the invention.

Otherwise, the anchoring function may be provided owing to an arrangement of circumferential cords, as illustrated for example in FIGS. 3 to 5. Circumferential cords 21, preferably arranged in the form of stacks 22, form an arrangement of anchoring cords, provided in each of the beads. These cords are preferably metallic, and possibly brass-coated. Various variants advantageously provide for cords which are textile in nature, such as, for example of aramid, nylon, PET, PEN, or hybrid, or of another nature, for example glass fibres. In each stack, the cords are advantageously substantially concentric and superposed.

In order to ensure perfect anchoring of the reinforcement structure, a stratified composite bead is produced. Within the bead 1, between the cord alignments of the reinforcement structure, there are arranged the circumferentially oriented cords 21. These are arranged in a stack 22 as in the drawings, or in a plurality of adjacent stacks, or in any suitable arrangement, depending on the type of tyre and/or the desired characteristics.

The radially inner end portions of the reinforcement structure 10 cooperate with the cord windings. Anchoring of these portions in said beads is thus effected. In order to promote this anchoring, the space between the circumferential cords and the reinforcement structure is occupied by a bonding or anchoring rubber composition 60. It is also possible to provide for the use of a plurality of mixes having different characteristics, defining a plurality of zones, the combinations of mixes and the resultant arrangements being virtually unlimited. By way of non-limitative example, the modulus of extension of such a mix may reach or exceed 10 to 15 MPa, and even in some cases reach or even exceed 40 MPa.

The arrangements of cords may be arranged and manufactured in several ways. For example, a stack may advantageously be formed of a single cord wound (substantially at zero degrees) in a spiral over several turns, preferably from the smallest diameter towards the largest diameter. A stack may also be formed of a plurality of concentric cords laid one in another, so that rings of gradually increasing diameter are superposed. It is not necessary to add a rubber mix to impregnate the reinforcement cord, or the circumferential windings of cord.

FIGS. 1 to 6 illustrate various preferred embodiments according to the invention. A sidewall insert 30, formed of a substantially rigid rubber composition, extends substantially radially between the region of the base of the sidewall and the shoulder region of the tyre. The main function of this insert is to enable the tyre to support a certain load when used at low pressure, or even at zero pressure.

Although the figures illustrate an insert of large dimensions, a similar function could be provided by one or more inserts of substantially different, in particular smaller, size.

In a large proportion of the sidewall, the insert 30 occupies a width greater than 50% of the total thickness of the wall of the sidewall. In the different figures, different asymmetrical arrangements of the sidewalls are shown, comprising, generally, an axially inner sidewall 61, intended to be positioned on the inside of the vehicle, and an axially outer sidewall 62, intended to be positioned on the outside of the vehicle, the inner and outer sidewalls joining a tread 70 radially towards the outside, each of said sidewalls being reinforced by a sidewall insert 30, namely an inner insert 31 in the inner sidewall 61, and an outer insert 32 in the outer sidewall 62, said inserts 31, 32 being formed of rubber composition enabling the sidewalls to bear a load corresponding to part of the weight of the vehicle in a situation in which the inflation pressure is substantially reduced or zero, the inner sidewall 61 (and more particularly the insert 31 of this sidewall 61) having a substantially higher modulus of extension than the outer sidewall 62 (and more particularly than the insert 32 of this sidewall 62).

In the different examples illustrated, a crown reinforcement 80, and beads furthermore comprising an anchoring zone 90 enabling the reinforcement structure 10 to be held, complete the main architectural elements.

The outer insert 32 and the inner insert 31 are subdivided into an unequal number of zones. In the examples of embodiment of FIGS. 1 to 5, the outer insert 32 comprises a higher number of zones than the inner insert 31, and the outer insert 32 comprises at least two zones.

In the example of FIG. 1, the two zones of the outer sidewall consist of an axially outer zone 34, of given modulus of extension, and an axially inner zone 35, the modulus of extension of which is lower.

In the examples of embodiment of FIGS. 2 to 5, the outer insert 32 comprises three zones 33, 34 and 35, namely a substantially central zone 33, having the highest modulus of extension, an axially inner zone 35, of lower modulus of extension than that of the central zone, and an axially outer zone 34, also of lower modulus than that of the central zone. The modulus of extension of the axially inner zone 35 is preferably greater than that of the axially outer zone 34.

According to one variant embodiment, the modulus of extension of the axially outer zone 34 and the modulus of extension of the axially inner zone 35 are substantially equal.

Figure 6:
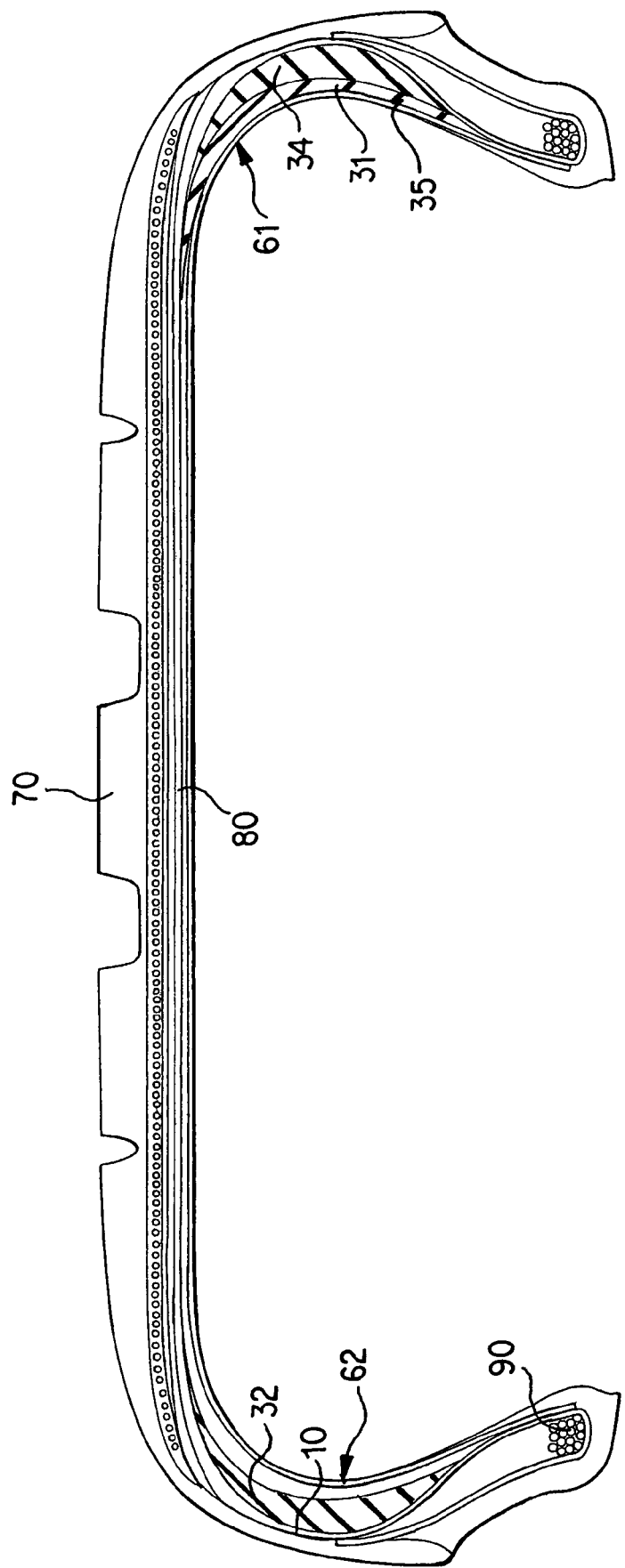
FIG. 6 illustrates a radial section showing essentially the beads, the sidewalls and the crown of another example of embodiment of the tyre according to the invention.

Similarly, in the examples of embodiment of FIGS. 5 and 6, the inner insert 31 comprises at least two zones, for example an axially outer zone 34, of given modulus of extension, and an axially inner zone 35, the modulus of extension of which is lower.

According to a variant which is not illustrated, the inner insert comprises three zones, for example a substantially central zone, having the highest modulus of extension, an axially inner zone, of lower modulus of extension than that of the central zone, and an axially outer zone, also of lower modulus of extension than that of the central zone.

Axially internally relative to the insert 30, a layer of substantially impermeable rubber composition 40 extends advantageously over substantially all the inner portion of the tyre in each of the disclosed embodiments. As the impermeable layer is the innermost layer, all the other layers benefit from the barrier effect thus created. The mix of this layer 40 is advantageously based on butyl rubber. Table I gives more details of the main constituent elements of this mix. We should furthermore point out the relatively low modulus of extension of this mix.

As illustrated in the various examples of embodiment, the layer 40 is preferably anchored in the axially inner portion of the bead. The resulting anchored portion 41 provides effective protection against any incipient cracks, or separations, etc.

A layer of bonding mix 50 may be arranged between the impermeable layer 40 and the insert 30 in each of the disclosed embodiments. This layer is formed of a rubber composition of a modulus of extension which is substantially intermediate compared with the two types of materials surrounding it: namely on one hand the impermeable layer 40, of low modulus of extension, and the insert 30, of substantially high modulus of extension.

The layer 50 advantageously extends from one bead to the other, including extending into the crown zone. Otherwise, this layer extends substantially over the entire height of the inserts, on each sidewall, and is interrupted in the crown zone.

The carcass-type reinforcement structure 10 runs along the sidewall along a preferred course close to said insert 30. Thus, in FIGS. 1 and 2, said structure 10 is laid axially externally relative to the insert 30 and runs advantageously in direct contact with the insert, over the greater part of the course of the sidewall.

The direct contact between the reinforcement structure and the insert makes it possible to optimise the rigidity and mechanical strength characteristics of the sidewall.

Table I shows examples of rubber composition used for the different elements of the tyre, preferred ranges of thickness, and several properties representative of these materials.

TABLE I

| | (phr: parts by weight per hundred parts of elastomer(s)) | | | |
|---|---|---|---|---|
| | Inner layer | Bonding layer | Sidewall insert | Intermediate layer |
| Ingredient A | Butyl rubber (IIR) 40-100 phr | (NR or IR)* 40-100 phr (preferably >55%) | (NR or IR)* 20-100 phr | (NR or IR)* 40-100 phr |
| Ingredient B | (NR or IR)* 0-60 phr | SBR 0-60 phr | SBR 0-50 phr | SBR 0-60 phr |
| Ingredient C | SBR 0-60 phr | BR 0-60 phr | BR 0-80 phr | BR 0-60 phr |
| Modulus (MPa) | 1.5-3.5 | 2-4 | 5-13 | 2-4 |
| Preferred thickness (mm) | Between 0.5 and 1.2 | Between 0.4 and 2 Preferably 0.6-1.2 | Between 3 and 20 Preferably 5-14 | Between 0.2 and 1.5** |

*natural rubber or synthetic polyisoprene having a high cis-1,4 linkage content
**the thickness is measured from the external part (or back) of the cords of the structure 10 (and not between the cords).

Finally, here are some illustrations, as non-limiting examples, of formulations of the various mixes:

Rubber Composition Forming Each Sidewall Insert:

the following mix formulation, in parts by weight per hundred parts of elastomer (phr):

| | |
|---|---|
| natural rubber: | 35 phr |
| polybutadiene: | 65 phr |
| carbon black N660: | 65 phr |
| "6PPD": | 3 phr |
| sulphur: | 2.5 phr |
| "CBS": | 3.5 phr |
| zinc oxide: | 3 phr |
| stearic acid: | 3 phr, | where "6PPD" is N-(1,3-dimethylbutyl)-N'-phenyl-p-phenylenediamine, an agent which is both an antioxidant and an antiozonant, and "CBS" is N-cyclohexyl-benzothiazyl-sulphenamide, a vulcanisation accelerator.

Rubber Composition Forming the Bonding Layer:

the following mix formulation, in parts by weight per hundred parts of elastomer (phr):

| | |
|---|---|
| natural rubber: | 75 phr |
| styrene/butadiene copolymer | 25 phr |
| carbon black N660: | 45 phr |
| aromatic oil: | 5 phr |
| "6PPD" | 1 phr |
| sulphur: | 2 phr |
| "CBS": | 1 phr |
| zinc oxide: | 3 phr |
| stearic acid: | 1 phr |

Bonding Layer Having Improved Oxygen Fixation:

the following mix formulation, in parts by weight per hundred parts of elastomer (phr):

| | |
|---|---|
| natural rubber: | 75 phr |
| styrene/butadiene copolymer | 25 phr |
| carbon black N660: | 45 phr |
| aromatic oil: | 5 phr |
| "6PPD" | 1 phr |
| sulphur: | 3.5 phr |
| "CBS" | 1 phr |
| zinc oxide: | 7 phr |
| stearic acid: | 1 phr |
| cobalt salt | 0.2 phr |
| or | |
| natural rubber: | 75 phr |
| styrene/butadiene copolymer | 25 phr |
| carbon black N660: | 45 phr |
| aromatic oil: | 5 phr |
| "6PPD" | 1 phr |
| sulphur: | 3.5 phr |
| "CBS": | 1 phr |
| zinc oxide: | 7 phr |
| stearic acid: | 1 phr |
| iron salt | 0.02 phr | where "phr" designates the percentage of elastomer by weight.

It will be noted that the impermeable layer according to the invention could be formed of a rubber composition based on an elastomer other than butyl rubber (IIR), for example a halobutyl rubber (XIIR) or a paramethylstyrene/isobutylene copolymer.

The industrial manufacture of a tyre according to the invention may be carried out using several types of processes. Advantageously, a principle of laying on a central core is used which permits either individual laying of the constituent elements such as the rubber mixes and the reinforcing threads (cords) or alternatively the laying of semi-finished products such as reinforced rubber lamellae.

Although the present invention has been described in connection with preferred embodiments thereof, it will be appreciated by those skilled in the art that additions, modifications, substitutions and deletions not specifically described may be made without departing from the spirit and scope of the invention as defined in the appended claims.

What is claimed is:

1. A tyre adapted for extended-mobility travel, comprising at least one carcass-type reinforcement structure anchored at each side of said tyre in a bead the base of which is configured to be mounted on a rim seat; said beads extending substantially radially externally and joining inner and outer sidewalls, respectively, said inner sidewall arranged to be positioned to the inside of a vehicle, the outer sidewall arranged to be positioned to the outside of the vehicle; the inner and outer sidewalls extending radially outwardly and joining a reinforced crown having a tread; the carcass-type reinforcement structure extending from said beads towards respective inner and outer sidewalls, each of the beads comprising an anchoring zone in which the reinforcement structure is held; said inner sidewalls being reinforced by an inner insert, and the outer sidewall being reinforced by an outer insert, said inner and outer inserts being formed of rubber composition; wherein each sidewall bears a load corresponding to a respective part of the vehicle when the tyre inflation pressure is substantially reduced or zero; the inner sidewall having a substantially higher modulus of extension than the outer sidewall; one of the inner and outer inserts comprising at least one zone, and the other of the inner and outer inserts comprising a plurality of zones the number of which being greater than that of said one insert; wherein at least two zones of said other insert have different respective modulii of extension.

2. A tyre according to one of claim 1 wherein said one insert comprises only one zone.

3. A tyre according to claim 1 wherein said outer insert constitutes said other insert.

4. A tyre according to claim 3 wherein said outer insert comprises an axially outer zone and an axially inner zone, the modulus of extension of the axially inner zone being lower than that of the axially outer zone.

5. A tyre according to claim 3 wherein said outer insert comprises three zones.

6. A tyre according to claim 5, in which the three zones are defined by a substantially central zone, having the highest modulus of extension, an axially inner zone of lower modulus of extension than the substantially central zone, and an axially outer zone of lower modulus of extension than the substantially central zone.

7. A tyre according to claim 6, in which the modulus of extension of the axially inner zone is greater than that of the axially outer zone.

8. A tyre according to claim 6, in which the three zones are defined by a substantially central zone, an axially inner zone, and an axially outer zone, wherein the modulus of extension of the axially outer zone and the modulus of extension of the axially inner zone are substantially equal.

9. A tyre according to claim 1 wherein the inner insert comprises at least an axially outer zone and an axially inner zone, the modulus of extension of the axially inner zone being lower than that of the axially outer zone.

10. A tyre according to claim 1, in which the inner insert comprises a substantially central zone, an axially inner zone of lower modulus of extension than the substantially central zone, and an axially outer zone of lower modulus of extension than the substantially central zone.

11. A vehicle having front and rear tyres, each of the front and rear tyres adapted for extended-mobility travel and comprising at least one carcass-type reinforcement structure anchored at each side of said tyre in a bead the base of which is configured to be mounted on a rim seat; said beads extending substantially radially externally and joining inner and outer sidewalls, respectively, said inner sidewall positioned to the inside of the vehicle, the outer sidewall positioned to the outside of the vehicle; the inner and outer sidewalls extending radially outwardly and joining a reinforced crown having a tread; the carcass-type reinforcement structure extending from said beads towards respective inner and outer sidewalls, each of the beads comprising an anchoring zone in which the reinforcement structure is held; said inner sidewalls being reinforced by an inner insert, and the outer sidewall being reinforced by an outer insert, said inner and outer inserts being formed of rubber composition; wherein each sidewall bears a load corresponding to a respective part of the vehicle when the tyre inflation pressure is substantially reduced or zero; the inner sidewall having a substantially higher modulus of extension than the outer sidewall; one of the inner and outer inserts comprising at least one zone, and the other of the inner and outer inserts comprising a plurality of zones the number of which being greater than that of said one insert; wherein at least two zones of said other insert have different respective modulii of extension.

* * * * *